Patented Apr. 22, 1952

2,593,893

UNITED STATES PATENT OFFICE 2,593,893

PRIMARY CELL

Bernard H. King, Indianapolis, Ind., assignor to P. R. Mallory & Co., Inc., Indianapolis, Ind., a corporation of Delaware Application April 14, 1947, Serial No. 741,294

19 Claims. (Cl. 136—107)

The present invention relates to the art of primary cells, and, more particularly, to alkaline "dry" cells of novel and improved character.

In the co-pending application of Samuel Ruben, Serial No. 604,269, filed July 10, 1945, now Patent No. 2,422,045, and entitled Alkaline Dry Cell, there is disclosed an alkaline dry cell having an amalgamated zinc anode, a cathode of a depolarizer material including an electrolytically reducible oxygen-yielding compound, and an alkaline electrolyte, such as an aqueous solution of an alkali metal hydroxide initially containing a substantial quantity of dissolved zinc. The electrolyte is immobilized against free flow and migration of impurities and deleterious materials from one electrode to the other is inhibited. In another copending application of the said Samuel Ruben, Serial No. 671,200, filed May 21, 1946, and entitled Primary Cell and Battery, there is disclosed a primary cell comprising an electrolyte element which may be formed of an aqueous alkaline solution which is immobilized by a compatible addition agent, preferably a material which converts the electrolyte into a gel.

The present invention is an improvement over the aforesaid co-pending application, Serial No. 671,200.

It is an object of the invention to provide an alkaline primary cell of a new construction capable of delivering very high currents and which may be conveniently assembled at a saving over present methods of manufacture.

It is a further object of the present invention to provide a primary cell, specifically an alkaline dry cell, in which the anode and the electrolyte are structurally combined into a single element.

It is another object of the present invention to provide a novel anode element particularly suitable for primary cells of the alkaline type in the form of a body of amalgamated zinc powder combined with a mixture of an aqueous alkaline electrolyte, having a substantial quantity of zinc dissolved therein, and a suitable gelling agent, the said anode element being capable of performing both the functions of the anode and of the electrolyte.

It is a further object of the present invention to provide a method of producing substantially solid anode-electrolyte slugs in a rapid, practical and economical manner which may be employed in the manufacture of alkaline primary or dry cells on a quantity production scale.

Figure 1:
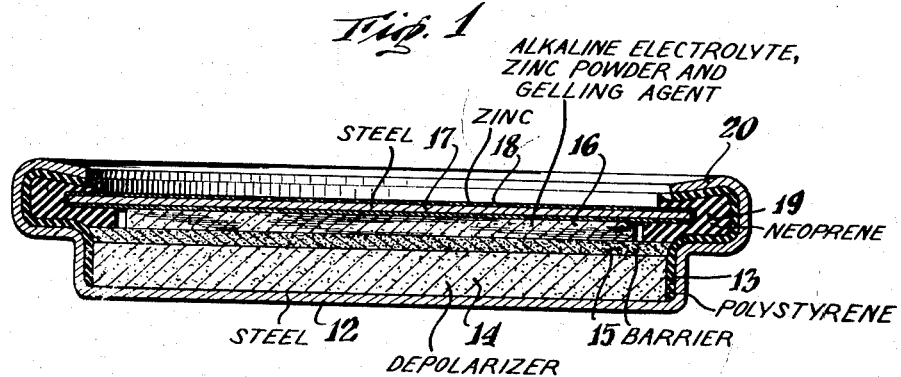
Figure 2:
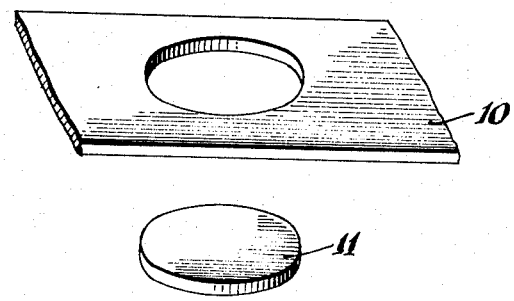

Other and further objects and advantages of the present invention will become apparent from the following description, taken in conjunction with the accompanying drawing, in which:

Fig. 1 is a sectional view of a cell embodying features of the present invention; and Fig. 2 illustrates a step in the making of a combination anode and electrolyte element.

In the conventional production of alkaline primary cells employing anodes of amalgamated zinc powder, it is customary to pellet the powder into small anode discs. These are then assembled in the cell with electrolyte impregnated spacers or gel electrolyte. For a more detailed description of the assembly processes, reference may be had to the above mentioned Ruben applications. I have discovered that it is possible to simplify the structure, methods of assembly and improve the characteristics of the cell by combining the amalgamated zinc powder with a gel electrolyte without the necessity of pre-pelleting or compacting the zinc powder.

It has previously been suggested in a pending application of Judson West, Jr., and Charles E. Van Hoy, Serial No. 702,510, filed October 10, 1946, for "Dry Cell Battery" that alkaline electrolytes, such as those containing an alkali metal hydroxide and zinc oxide, can be gelatinized by the addition of carboxymethyl cellulose.

Broadly, the invention comprises a combination anode-electrolyte member formed from a mixture of particles of an anode material combined with immobilized electrolyte. In accordance with the principles of my invention, I provide an aqueous alkali metal hydroxide solution to which there is added a compatible gelling agent, for example an alkali metal salt of carboxy-methyl cellulose, such as sodium carboxy-methyl cellulose. Sodium carboxy-methyl cellulose is a cellulose derivative that is readily soluble or dispersible in water and is obtainable in the market as a white granular powder. Preferably, the electrolyte contains a substantial proportion of dissolved alkali metal zincate. A suitable quantity of amalgamated zinc powder is stirred into the electrolyte-gel mixture and the resulting product is poured or placed into the cell structure or is first allowed to gel into a solid rubbery mass from which slugs of appropriate shape may be punched and may be introduced into the previously prepared cell structure, as will be set forth more fully hereinafter.

In order that those skilled in the art may have a better understanding of the invention, and of the preferred manner in which it is practiced, the following illustrative example may be given:

One suitable electrolyte is formed of:

| | Grams |
|---|---|
| Potassium hydroxide (88% KOH) | 75 |
| Zinc oxide | 10 |
| Water | 100 |

The sodium carboxy-methyl cellulose is added to the electrolyte in proportions of 2 to 8 grams per 100 grams of solution. In preparing the electrolyte the potassium hydroxide is added to 25 grams of water and the zinc oxide added. The mixture is stirred and heated to 180–190° C. and then allowed to cool to 110° C. after which 25 grams of water are added and the solution stirred and cooled to 80° C. The remaining 50 grams of water are added, a clear solution being obtained.

The sodium carboxy-methyl cellulose, crushed and suitably screened, is slowly added to the electrolyte with constant stirring. Thereafter, the amalgamated zinc powder is stirred into the same and intimately mixed therewith. The amount of zinc powder used should be adequate to provide a highly conductive anode-electrolyte member and preferably the zinc should constitute 35 to 70% of the resulting mixture. The mixture may then be poured or placed into flat molds or dishes where it is allowed to solidify or gel to a flexible plate or sheet 10 (Fig. 2), from which discs or slugs 11 may be punched.

Wide variations are possible as to the type and size of zinc powder particles and as to method of amalgamation used. Good results are obtained, for example, with iron-free zinc powder of about 60 mesh particle size which has been amalgamated with 5 to 15% by weight of mercury.

As an alternative, the amalgamated zinc powder of suitable particle size may be spread out in a layer in a flat dish and hot electrolyte gel mixture poured thereover in the amount of about 100 grams of the mixture for 100 grams of the zinc powder. Upon cooling, a tough rubbery sheet or plate is formed from which slugs may be punched in the manner described in the foregoing, suitable for use as combination anode-electrolyte elements in alkaline primary cells.

Referring now more particularly to Fig. 1 of the drawing, a section of a preferred form of primary cell is shown embodying the principles of the present invention. The cell container and positive terminal comprises a shallow circular cup 12 of steel or other metal inert to the alkaline electrolyte. The side wall of the cup is preferably coated with an insulating coating 13 inert to the electrolyte, for example, polystyrene applied as a solution in xylol and dried. Cathode composition of depolarizer material 14 is pressed into a depression of reduced diameter in the bottom of the cup under high pressure. If desired the bottom of the cup may first be sprayed with a graphite paint to improve the contact between the cathode and the bottom. A suitable paint may be formed of ten per cent by weight of graphite and two per cent ethyl cellulose in a xylol solution.

As it is set forth more fully in the aforesaid copending application Serial No. 604,269, now Patent No. 2,422,045, of Samuel Ruben, the cathode composition 14 may be a depolarizer material including an electrolytically reducible oxygen-yielding compound, such as electrolytically reducible metal oxides and permanganates to which a small quantity of an inert material of higher conductivity may be added. Specifically, good results are obtained with cathodes composed of mercuric oxide having a small percentage of micronized graphite intimately mixed therewith. A porous barrier disc 15 is located over the depolarizer layer.

The cell anode, which at the same time performs also the function of the electrolyte, is provided in the form of a solid disc or slug 16, prepared in accordance with the method described in the foregoing. The anode-electrolyte slug 16 is held in pressure contact with barrier layer 15 by top disc 17, which also constitutes the negative terminal of the cell. Top disc 17 comprises a solid amalgamated disc of zinc or zinc base metal of relatively heavy gauge or a steel disc which has been hot zinc dipped to coat it with a thin layer of zinc 18 and then superficially amalgamated. A zinc coating three-tenths of a mil which has been amalgamated in a solution of 3% mercuric cyanide in the potassium hydroxide electrolyte is suitable.

An internally-grooved insulative ring or grommet 19 formed of chloroprene rubber known in the trade under the name neoprene encloses the edge of the top disc. The flange 20 of the steel cup 12 is rolled or spun down over the grommet and applies a constant pressure to it, thereby closing the cell in an air-tight manner. This cell has a comparatively short electrolyte path to all parts of the zinc anode surface so that the entire area is very effectively used.

The potential of a cell of the described character is, of course, determined to a substantial extent by the type of cathode material used. Thus, the potential of a cell of the described construction having a cathode of mercuric oxide with about 5% by weight of micronized Madagascar graphite admixed thereto is 1.34 volts.

The cell of this invention is characterized by its ability to withstand heavy current drains in excess of the usual zinc powder anode dry cells and also by its satisfactory operation at low temperatures. By combining the anode and electrolyte, pellets or slugs may be readily punched out of plates or sheets and handled in a simple and efficient manner during cell assembly operations. The use of the invention eliminates the necessity of prepelleting the amalgamated zinc particles and also eliminates considerable electrolyte handling.

Although the present invention has been disclosed in connection with a preferred embodiment thereof, variations and modifications may be resorted to by those skilled in the art without departing from the principles of the invention. I consider all of these variations and modifications to be within the true spirit and scope of the present invention, as disclosed in the foregoing description and defined by the appended claims.

What is claimed is:

1. A composite anode-electrolyte member for primary cells consisting of a substantially solid self-supporting body composed throughout of a uniform mixture of anode metal particles, of an electrolyte, and of a compatible gelling agent.

2. A composite anode-electrolyte member for primary cells consisting of a substantially solid self-supporting body composed throughout of a uniform mixture of amalgamated zinc particles, of an aqueous electrolyte solution, and of a compatible gelling agent immobilizing said solution and converting it into a body of substantially solid consistency.

3. A primary alkaline cell comprising an air tight assembly, an anode-electrolyte member therein comprising amalgamated zinc particles admixed with a gelled alkaline electrolyte containing zincate in solution in an amount adequate to effectively limit open circuit electrolyte-zinc reaction and gas generation, a depolarizer-cathode member comprising an oxygen yielding compound, and an ionically permeable chemically inert barrier element interposed between said anode and cathode members.

4. A primary cell comprising, in combination, a cathode of depolarizer material comprising an electronically-conductive coherent mass including an oxygen-yielding compound of a metal, an immobilized body of electrolyte having a substantial quantity of zinc particles distributed therein which constitute the anode of said cell, and an ionically permeable chemically inert barrier element interposed between said cathode and said anode.

5. An alkaline primary cell comprising, in combination, a cathode of depolarizer material comprising an electronically-conductive bonded coherent mass of low electrical resistance including an oxygen-yielding compound of a metal, an immobilized body of alkali metal hydroxide electrolyte initially containing a substantial quantity of alkali metal zincate spaced from said cathode, metallic zinc particles uniformly distributed in said immobilized electrolyte body collectively constituting the anode of said cell, and an ionically permeable chemically inert barrier element filling out the space between said cathode and said anode.

6. An alkaline primary cell comprising, in combination, a zinc anode, a cathode of depolarizer material comprising an electronically-conductive coherent mass including an oxygen-yielding compound of a metal, a body of potassium hydroxide electrolyte initially containing a substantial quantity of potassium zincate immobilized with a compatible gelling agent spaced from said cathode, said zinc anode being in the form of metallic zinc particles uniformly distributed in said body of electrolyte and an ionically permeable chemically inert barrier element interposed between and in contact with said cathode and said body of electrolyte.

7. An alkaline dry cell comprising a combination cathode and depolarizer constituted by an electronically-conductive coherent mass including an electrolytically reducible oxygen-yielding compound of a metal, a combination anode and electrolyte constituted by an alkali metal hydroxide gel initially containing a substantial quantity of alkali metal zincate and having uniformly distributed therein a substantial quantity of finely divided metallic zinc, and a minutely porous barrier element interposed between and in contact with said cathode and anode, said barrier element being ionically permeable but restricting travel of deleterious materials from said cathode to said anode.

8. An alkaline dry cell comprising, in combination, an electronically-conductive coherent mass including an electrolytically-reducible oxygen-yielding compound of a metal capable of functioning as the cathode and depolarizer, a body of potassium hydroxide gel initially containing a substantial quantity of potassium zincate and having 35 to 70% by weight of finely divided metallic zinc uniformly distributed therein capable of functioning as the anode and electrolyte, a barrier layer of minutely porous chemically inert material interposed between and in contact with said cathode and said anode, and an air-tight enclosure for said cathode, anode and barrier layer.

9. An alkaline dry cell comprising, in combination, an air-tight enclosure, a cathode of depolarizer material in said enclosure and comprising an electronically-conductive coherent mass of low electrical resistance including an oxygen-yielding compound of a metal, an anode comprising a body of alkali metal hydroxide electrolyte initially containing a substantial quantity of zinc dissolved therein and also containing a substantial quantity of undissolved zinc powder uniformly distributed therein, said anode body being immobilized and gelled by the addition of a compatible cellulose derivative that is readily dispersible in the electrolyte, a chemically inert ionically permeable barrier element interposed between and in contact with said cathode and anode, and an amalgamated zinc base top plate in pressure contact with said anode and in insulative sealing relation with said enclosure.

10. An alkaline primary cell comprising a combination cathode and depolarizer constituted by an electronically-conductive coherent mass including an electrolytically reducible oxygen-yielding compound of a metal, a combination anode and electrolyte constituted by a body comprising potassium hydroxide, dissolved zinc, metallic zinc powder and sodium carboxy-methyl cellulose, and an ionically permeable chemically inert barrier element interposed between and in contact with said cathode and said anode.

11. An alkaline primary cell comprising a combination cathode and depolarizer constituted by an electronically-conductive coherent mass including an electrolytically reducible oxygen-yielding compound of a metal; a combination anode and electrolyte constituted by a substantially solid body including an alkali metal hydroxide initially containing a substantial quantity of zincate and zinc powder, and a quantity of sodium carboxy-methyl cellulose sufficient to gel the electrolyte; an ionically permeable chemically inert barrier interposed between said cathode and said anode; an enclosure of inert metal for said cathode anode and barrier in contact with said cathode but electrically disconnected from said anode; and a metal top plate in contact with said anode and in air-tight insulative sealing relation with said enclosure; said enclosure and said top plate constituting the two terminals of the cell.

12. A composite anode-electrolyte element for alkaline primary cells in condition ready for use consisting of a solid body including an alkali metal hydroxide electrolyte, a substantial quantity of zinc dissolved in the electrolyte, a substantial quantity of zinc powder uniformly dispersed in the electrolyte, and sodium carboxy-methyl cellulose admixed with the electrolyte and maintaining the same in a gelled condition.

13. An anode element particularly for alkaline primary dry cells in condition ready for use comprising a slug of generally form-retaining gel consistency including a potassium hydroxide electrolyte, a substantial quantity of zinc oxide dissolved in the electrolyte, amalgamated metallic zinc powder uniformly distributed in the electrolyte, and sodium carboxy-methyl cellulose.

14. The method of making anode elements for alkaline primary cells which comprises dissolving zinc oxide in an aqueous alkali metal hydroxide solution, adding sodium carboxy-methyl cellulose to the solution, admixing zinc powder to the mixture, placing the composite mixture into flat molds to allow it to consolidate into a self-sustaining layer of gel consistency, and cutting individual anode slugs from the consolidated layer.

15. An alkaline primary cell comprising a combination cathode and depolarizer constituted by an electronically-conductive coherent mass including an electrolytically reducible oxygen-yielding compound of a metal; a combination anode and electrolyte constituted by a substantially solid body including an alkali metal hydroxide initially containing a substantial quantity of zincate and zinc powder, and a quantity of sodium carboxy-methyl cellulose sufficient to gel the electrolyte; an ionically permeable chemically inert barrier interposed between said cathode and said anode; an enclosure of inert metal for said cathode anode and barrier in contact with said cathode but electrically disconnected from said anode; and a metal top plate in contact with said anode and in air-tight insulative sealing relation with said enclosure; said enclosure and said top plate constituting the two terminals of the cell.

16. A primary cell comprising, in combination, a coherent body of depolarizer material comprising an oxygen-yielding compound constituting the cathode of said cell, a gelled immobilized body of electrolyte having a substantial quantity of anode metal particles uniformly distributed therein which constitute the anode of said cell, and an electrolyte-permeable spacer element interposed between said cathode and said anode.

17. A primary alkaline cell comprising an air tight assembly, an anode-electrolyte member therein composed of amalgamated zinc particles uniformly admixed with a gelled alkaline electrolyte and uniformly dispersed throughout said electrolyte, said uniformly dispersed zinc particles constituting all of the zinc in the form of particles present in said cell, a depolarizer-cathode member comprising an oxygen yielding compound, and an ionically permeable chemically inert barrier element interposed between said anode-electrolyte and cathode members and being structurally independent from said members.

18. A composite anode-electrolyte element for alkaline primary cells in condition ready for use consisting of a solid body including an alkali metal hydroxide electrolyte, a substantial quantity of zinc powder uniformly dispersed in the electrolyte, and sodium carboxy-methyl cellulose admixed with the electrolyte and maintaining the same in a gelled condition.

19. An alkaline dry cell comprising, in combination, an electronically-conductive coherent mass including an electrolytically reducible oxygen yielding compound of a metal capable of functioning as the cathode and depolarizer, a body of potassium hydroxide gel containing 35% to 70% by weight of finely divided metallic zinc uniformly dispersed therein capable of functioning as the anode and electrolyte, and a minutely porous insulating barrier interposed between and in contact with said cathode and said electrolyte zinc mixture.

BERNARD H. KING.

REFERENCES CITED

The following references are of record in the file of this patent:

UNITED STATES PATENTS

| Number | Name | Date |
|---|---|---|
| 680,848 | Erny | Aug. 20, 1901 |
| 2,307,627 | Lawson | Jan. 5, 1943 |
| 2,422,045 | Ruben | June 10, 1947 |

OTHER REFERENCES

Hollabaugh et al.: J. Ind. and Eng. Chem., October 1945, page 943.